United States Patent [19]
Monett et al.

[11] 3,800,021
[45] Mar. 26, 1974

[54] METHOD OF MANUFACTURING WINDSHIELD WIPER BLADES

[75] Inventors: Edward Monett, Westfield; Jack E. Monett, Scotch Plains, both of N.J.

[73] Assignee: Roller Corporation of America, South Plainfield, N.J.

[22] Filed: Jan. 5, 1973

[21] Appl. No.: 321,130

Related U.S. Application Data
[63] Continuation of Ser. No. 122,053.

[52] U.S. Cl................... 264/177, 264/273, 264/297
[51] Int. Cl.......... B29c 1/14, B29d 3/02, B29h 3/10
[58] Field of Search........................... 264/273–277, 264/297, 219, 177; 425/251

[56] References Cited
UNITED STATES PATENTS

| | | | |
|---|---|---|---|
| 3,405,214 | 10/1968 | Butts | 264/276 X |
| 3,360,829 | 1/1968 | Germ | 425/251 |
| 3,272,904 | 9/1966 | Millard | 264/275 |
| 2,883,704 | 4/1959 | Jurgelitt | 425/251 |

Primary Examiner—Donald J. Arnold
Assistant Examiner—Richard R. Kucia

[57] ABSTRACT

Mold having bottom part containing extruded slotted aluminum rods in side by side relation having vertical slots expanded thereabove to form channels, side slats in said channels, perforated metal strips above said slats, a divider mold part having bottom grooves registering with perforations in said metal strips, a top cavity in said division part receiving loading material, and a top mold part having a plunger snugly fitting said loading material cavity.

5 Claims, 9 Drawing Figures

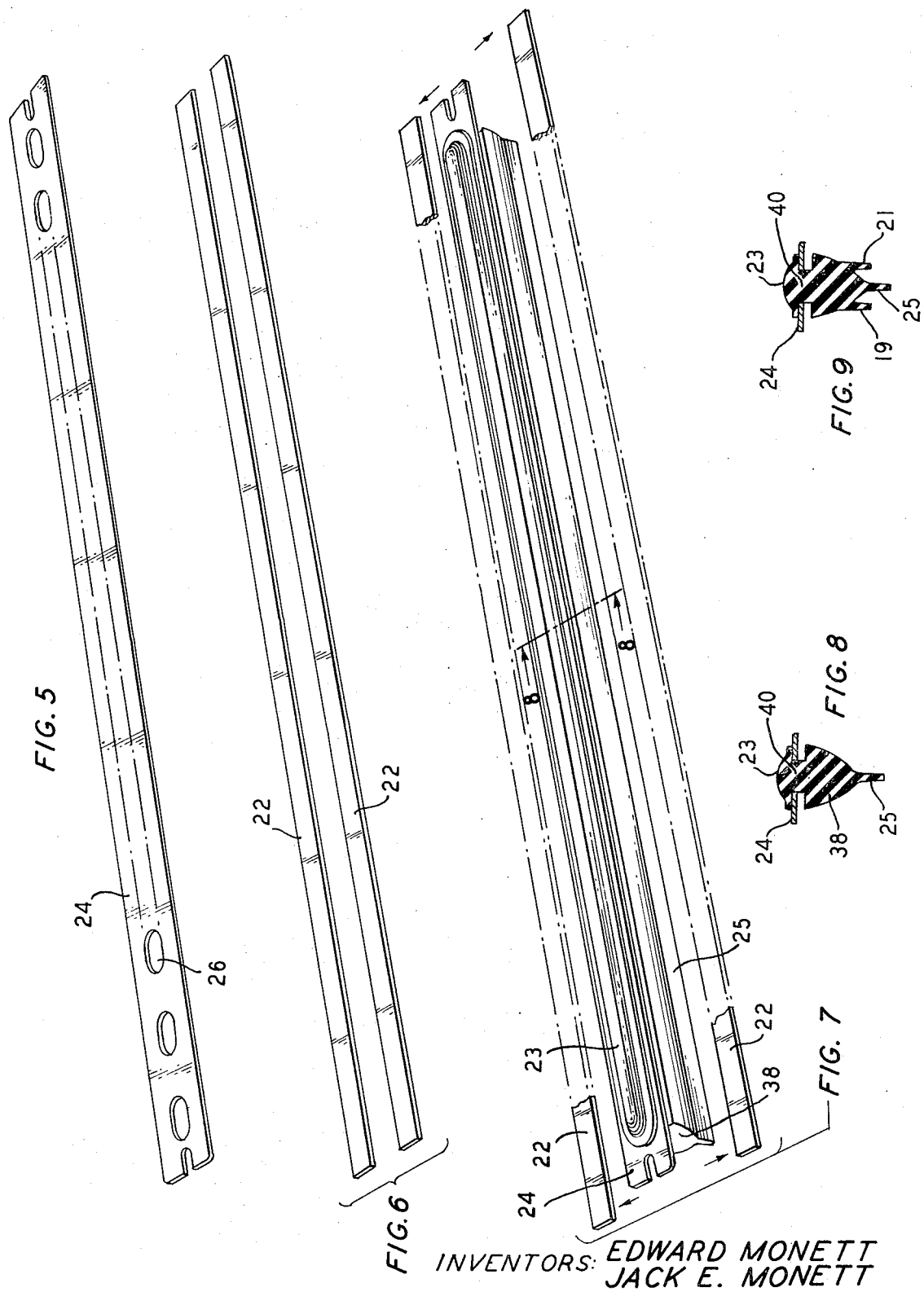

METHOD OF MANUFACTURING WINDSHIELD WIPER BLADES

This is a continuation of application Ser. No. 122,053, filed Mar. 8, 1971 now abandoned.

FIELD OF INVENTION

This invention relates to method and apparatus for manufacturing windshield wiper blades by transfer or injection molding of rubber or the like, and has for its objects to simplify, improve and economize the construction and operation of expedients of this character.

BACKGROUND

Heretofore the rubber has been vulcanized in a cavity by forming one or more groups of two blades lying flat therein and facing each other in integrated relation. The molding is then cut apart by either a rotating or a guillotine knife, to separate the blades. The edge therefore is only as good as the cutting method. Also the moldings must be deflashed, and a metal strip inserted into a longitudinal groove in the rubber.

It has been proposed to extrude the rubber shape, but this produces an inaccurate configuration, leaving the wiping edge wavy and not uniform in thickness. A machined cavity of such length, depth and thickness would be most difficult to keep clean, control contamination and residue buildup. It would be most difficult to chrome plate in the bottom of the cavity where it is most desired.

SUMMARY:

According to the present invention, a plurality of separate rods of uniform cross section are provided, each having a slot therein expanded to form an adjacent channel thereabove are assembled and in a cavity of a mold part, and a mating mold part thereover has grooves therein registering with said channels. Preferably the slots are substantially vertical, narrow at the bottom and expanded thereabove to form channels, and the rods are expendable, being formed by either an extrusion of aluminum or molded plastic insert into rods. Preferably expendable strips or side slats of molding material are mounted in said channels to form undercuts in the blades. Preferably perforated metal reinforcing strips are mounted above said slats.

Preferably the rods are inserted in side by side relation in the lower mold cavity, then the slats are inserted in the channels, then the perforated metal strip inserted over the side slats. Then the grooved mold part is placed over the metal strips, and molding material is loaded into a cavity above the grooves. Finally heat and pressure are applied to inject the loaded material through said groove perforations into said grooves, channels and slots.

IN THE DRAWINGS:

FIG. 5 is a perspective view of the reinforcing strip;

FIG. 6 is a perspective view of the side slats;

FIG. 7 is an exploded perspective of the side slats and finished wiper blade;

FIG. 8 is a cross section of the finished wiper blade, taken along the line 8 — 8 of FIG. 7; and FIG. 9 is a similar cross section of a modified windshield wiper blade.

PREFERRED EMBODIMENTS

Figure 1:
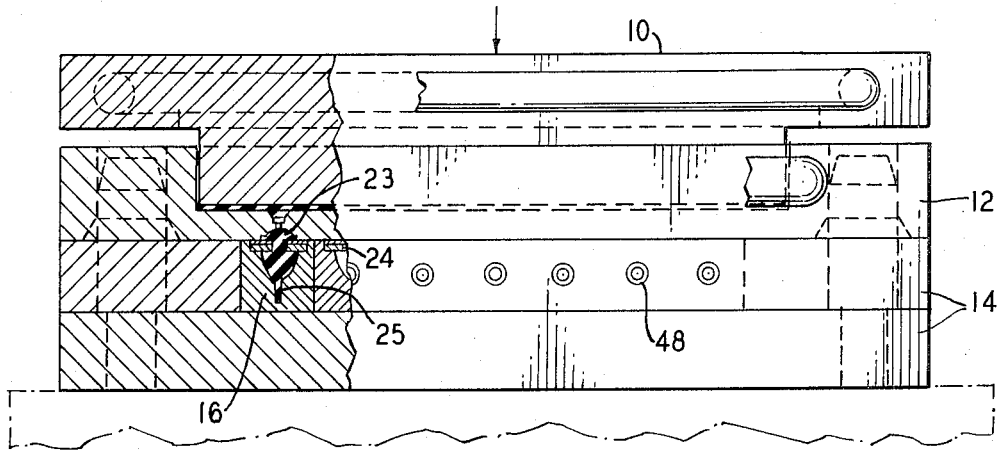
FIG. 1 is an end elevation of the mold for windshield wiper blades.
Figure 2:
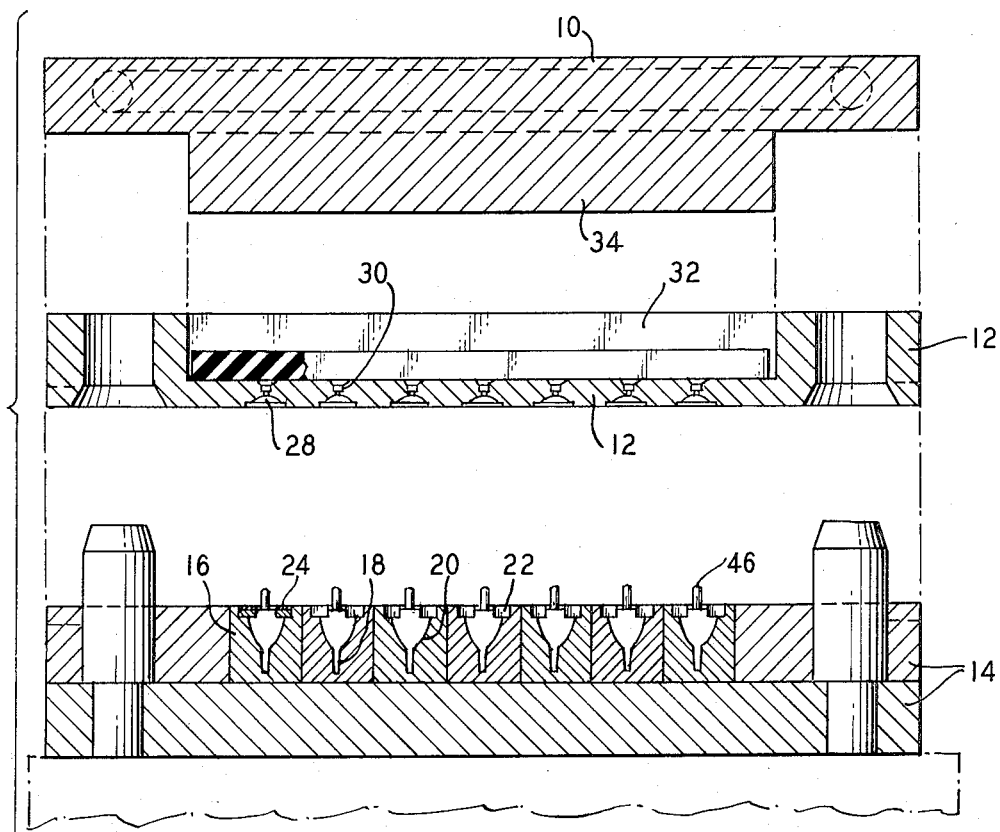
FIG. 2 is an exploded section taken parallel to the plane of FIG. 1.

The wiper blade is manufactured in a mold comprising a cope or top part 10, a divider part 12, and a drag or bottom part 14. Inserted into the cavity of the bottom part 14 are a plurality of rods 16 in side by side relation. These rods are separate and expendable, being extruded of molding material, such as aluminum or brass or a plastic molded insert.

The rods 16 each have a slot 18 therein, preferably vertical, narrow at the bottom and expanded at the top, forming channels 20. These channels receive separate molding slats 22 of expendable material, such as inexpensive synthetic composition. Inserted in the channels 20 on top of the side slats 22 are metal reinforcing strips 24 for the wiper, which strips have longitudinally spaced central perforations 26.

The middle or divider mold part 12 has in the underside thereof a plurality of uniformly transversely spaced parallel grooves 28 with uniformly longitudinally spaced apertures 30 therein. These apertures communicate with a cavity 32 in the top of the divider plate, which receives a loading of the material to be molded.

The cope or top mold part 10 of the mold has a plunger portion 34 snugly fitting the cavity 32 in the divider plate.

When the mold so assembled is subjected to heat and pressure, the unvulcanized rubber in the cavity 32 in the top of the divider plate is softened and injected through the apertures 30 into the grooves 28, thereby completely filling the wiper blade cavity. This pressure forces the rubber through the perforations 26 in the metal reinforcing strip 24 for the wiper, and fills the slot 18 and channels 20 between the side slats 22. This forms the crown 23 of the wiper as shown in FIG. 8, with the flexible narrow portion 40 depending from the perforations 26 of the metal strip, and the sharp blade 25 therebelow.

When the molding is completed, the top part 10 and divider part 12 are removed, and the finished wipers are taken out of the bottom part 14. The side slats 22 are removed and discarded. The aluminum extruded rods are examined, and if their slots 18 are unsatisfactory, they are removed and replaced. However, these rods will generally survive many moldings before their slots become contaminated and thereby fail to mold a sharp edge for the wiper blade.

As to advantages, the extruded slotted aluminum or plastic insert produces a perfect molded edge on the blade, and these extrusions and forms are inexpensive enough to discard and replace with new as they become dirty or contaminated. Also the former added operation of cutting the double molding apart to create a wiping edge is eliminated. For a smoother finish the molded plastic slats 22 which are inserted to form the blade undercut cavity for blade flexibility are similarly inexpensive and replaceable. The bonding through the perforations 26 of the metal strip 24, eliminates assembly and produces a more rigid and stronger product. Molding the blades flash free, by the snug fit of the plunger 34 in the cavity 32, lets them be packaged for shipment upon removal from the molds.

Figure 3:
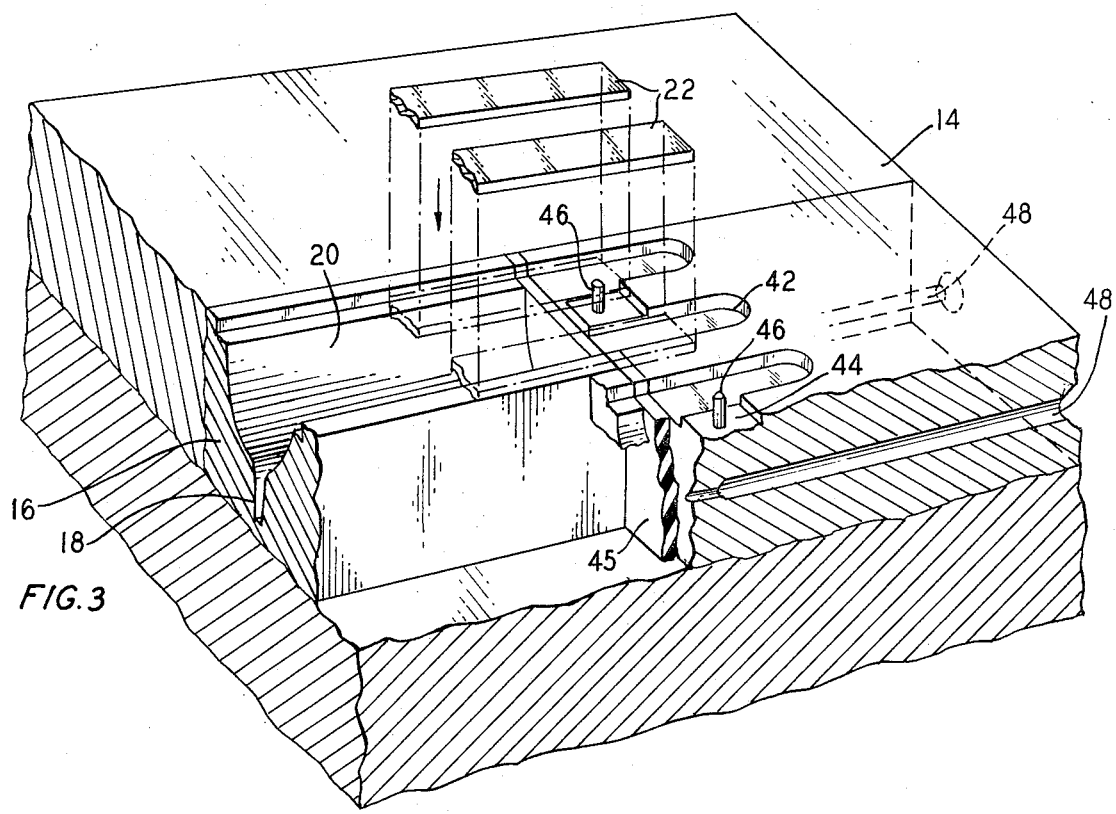
FIG. 3 is an exploded perspective, partly in section, of the same mold.
Figure 4:
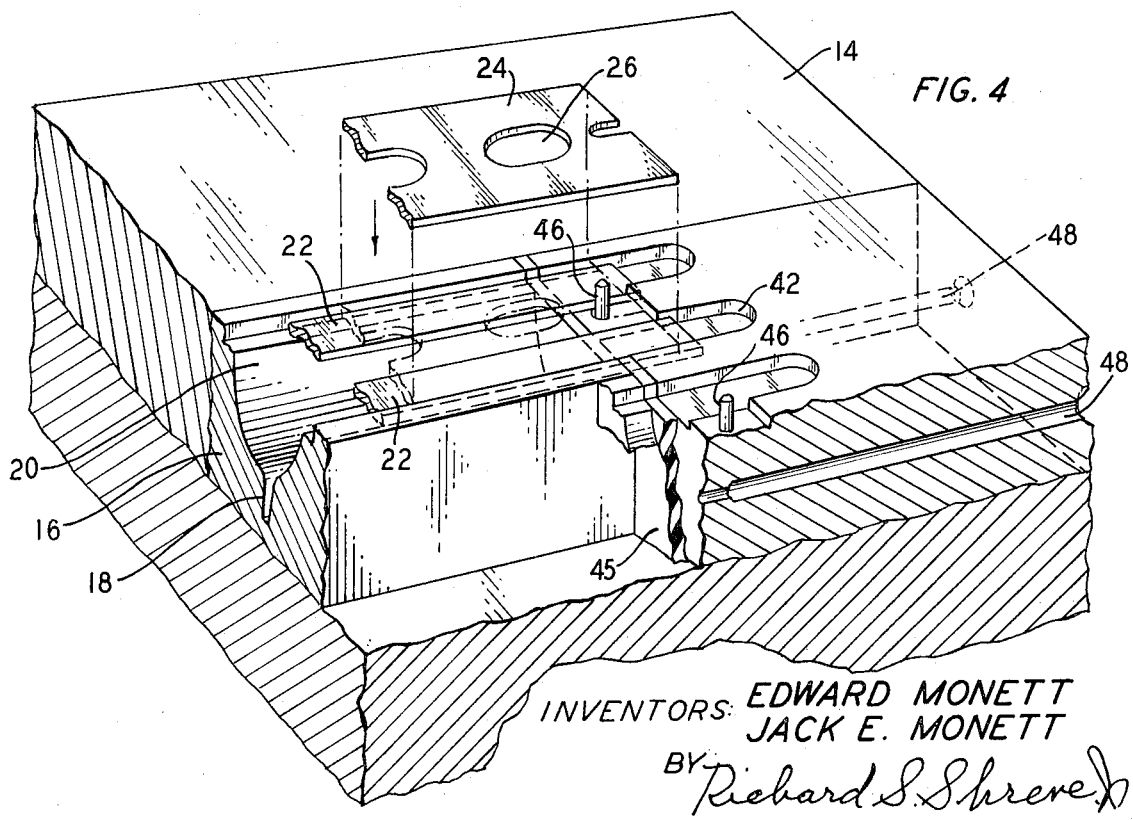
FIG. 4 is a similar view, with the reinforcing strip added.

As shown in FIGS. 3 and 4 the cavity in the bottom or drag part 14 of the mold is longer than the rods 16 for a short distance to receive a cushion 45 of rubber or the like, to allow for expansion under molding temperature. Beyond the ends of the cavity, the top of the mold drag 14 has recesses 42 to receive the ends of the side slats 22, and recesses 44 to receive the ends of the metal reinforcing strips 24. Locating pins 46 mounted in the recesses 44 register with and enter the end ones of the perforations 26. Vents 48 are provided for the escape of air from the mold.

In operation, the extruded slotted aluminum rods 16 are inserted into the cavity of the drag or bottom part 14 of the mold in side by side relation. Then the plastic slats 22 are inserted into the channels 20 of the rods 16. Then the perforated metal reinforcing strips 24 are placed on top of the plastic slats 22, with their end perforations in the recesses 44 and receiving locating pins 46.

After this, the middle or divider part 12 is superimposed upon the assembled drag or bottom part 14, with the apertures 30 of the divider part registering with the perforations 26 in the metal strip 24. The top cavity of the divider plate is now loaded with molding material such as natural or synthetic rubber.

Finally, the cope or top mold part 10 of the mold is lowered to bring the plunger portion 34 thereof down into the cavity of the divider plate on top of the molding material therein. The snug fit of the plunger portion 34 into the cavity 32 is sufficient to prevent any flashing out of the rubber.

In the modification shown in FIG. 9, the windshield wiper has a central wiping edge formed by the slot 18, but in addition thereto are other shorter wiper edges 19 and 21 on each side thereof and spaced therefrom, and formed by additional slots formed in the extruded aluminum rod 16.

What is claimed is:

1. A method of manufacturing windshield wiper blades and the like which comprise inserting into the cavity of the drag part of a mold having a flat bottom, a plurality of separate rods of uniform cross section each having a flat bottom and a top with a central longitudinal slot therein and expanded to form an adjacent channel;
   a. contacting said rods with each other in side by side relation with said flat bottoms thereof contiguous;
   b. contacting said flat bottoms with the flat bottom of said drag cavity of said mold to lie flat thereon;
   c. applying to said drag part of the mold a mating cope part of said mold with a cavity having parallel longitudinally-extending grooves therein extending from end to end thereof;
   d. registering said cope part grooves with said channels of said drag slots;
   e. positioning apertured blades reforcing plates between said drag part and the mating cope part with the apertures of the plates in communication with the respectively-registered cope grooves and channels of said drag slots; and
   f. forcing unvulcanized wiper blade material into said mating mold parts and through the apertures in said blade reinforcing plates to fill said grooves, channels and slots, thereby embedding said reinforcing plates in said unvolcanized wiper blade material.

2. A method as claimed in claim 1, in which said rods are extruded in the desired cross section before such insertion thereof.

3. A method as claimed in claim 1, in which said mating mold part has apertures uniformly spaced along the walls defining the grooves therein, and
   said unvulcanized wiper blade material is forced into said mating mold parts through said apertures.

4. A method as claimed in claim 1 wherein the transverse dimension of the respective channels is reduced in the region of the blade reinforcing plates by inserting within said channels before said mating mold part is applied, transversely-spaced side slats of synthetic material, thereby to impart transverse flexibility to the wiper blades between the plates and the wiping edge of the blade.

5. A method as claimed in claim 4, in which perforated reinforcing strips are inserted in said channels above said slats, and
   said unvulcanized wiper material passes from said grooves through said perforations into said channels and slots.

* * * * *